United States Patent [19]

Chang

[11] Patent Number: 5,357,849

[45] Date of Patent: Oct. 25, 1994

[54] AIR FRYER

[76] Inventor: Li-Hsia Chang, No. 16-1, Lane 742, San Feng Rd., Feng Yuan City, Taichung Hsien, Taiwan

[21] Appl. No.: 5,777

[22] Filed: Jan. 19, 1993

[51] Int. Cl.⁵ ............................................. A47J 37/00
[52] U.S. Cl. .................................. 99/340; 99/330; 99/450; 99/476; 126/21 A
[58] Field of Search .................. 34/192, 195–197; 99/330, 450, 476; 126/21 A, 273 R, 275 R, 275 E; 219/10.55 E; 220/4.03, 4.26, 4.27, 212, 331, 341, 379, 684, 912; 248/408

[56] References Cited

U.S. PATENT DOCUMENTS

| 872,739 | 12/1907 | McDaniel | 248/408 |
| 1,012,869 | 12/1911 | Lauzon | 99/450 |
| 2,473,632 | 6/1949 | Bode | 248/408 |
| 3,193,847 | 7/1965 | Mashura | 220/684 |
| 4,190,965 | 3/1980 | Erickson | 219/400 |
| 4,457,249 | 7/1984 | Diser | 403/380 |
| 4,817,509 | 4/1989 | Erickson | |
| 4,957,039 | 9/1990 | Reyes | 220/212 |
| 5,165,328 | 11/1992 | Erickson | 99/340 |
| 5,179,932 | 1/1993 | DeCarlo | 99/450 |
| 5,245,159 | 9/1993 | Chang | 99/330 |

Primary Examiner—David A. Scherbel
Assistant Examiner—Terrence R. Till
Attorney, Agent, or Firm—Bacon & Thomas

[57] ABSTRACT

An air fryer includes a base, a seat attached to the base, a post having a lower portion slidably received in the seat, an arm pivotally coupled to the upper portion of the post, and a cap secured to the arm for enclosing the base. The post is adjustable relative to the seat such that the cap is adjustable up and down relative to the base.

5 Claims, 5 Drawing Sheets

AIR FRYER

BACKGROUND OF THE INVENTION

1. Field of the Invention

The present invention relates to a fryer, and more particularly to an air fryer.

2. Description of the Prior Art

A typical air fryer is disclosed in U.S. Pat. No. 4,817,509 to Erickson, filed Feb. 17, 1987. In this patent, the air fryer includes a top pivotally coupled to a base member. The air fryer is suitable for cooking food pieces of definite sizes; it is not suitable for cooking food pieces of larger or smaller sizes.

The present invention has arisen to mitigate and/or obviate the afore-described disadvantages of the conventional air fryers.

SUMMARY OF THE INVENTION

The primary objective of the present invention is to provide a air fryer in which the cooking space can be changed.

In accordance with the preferred embodiment of the invention, there is provided an air fryer comprising a base, a seat attached to the base and including a space opened upward, a post having a lower portion slidably received in the space of the seat, an arm pivotally coupled to an upper portion of the post, a cap secured to the arm for enclosing the base, and means for fixing the post in the seat, whereby, the post is adjustable in the seat.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
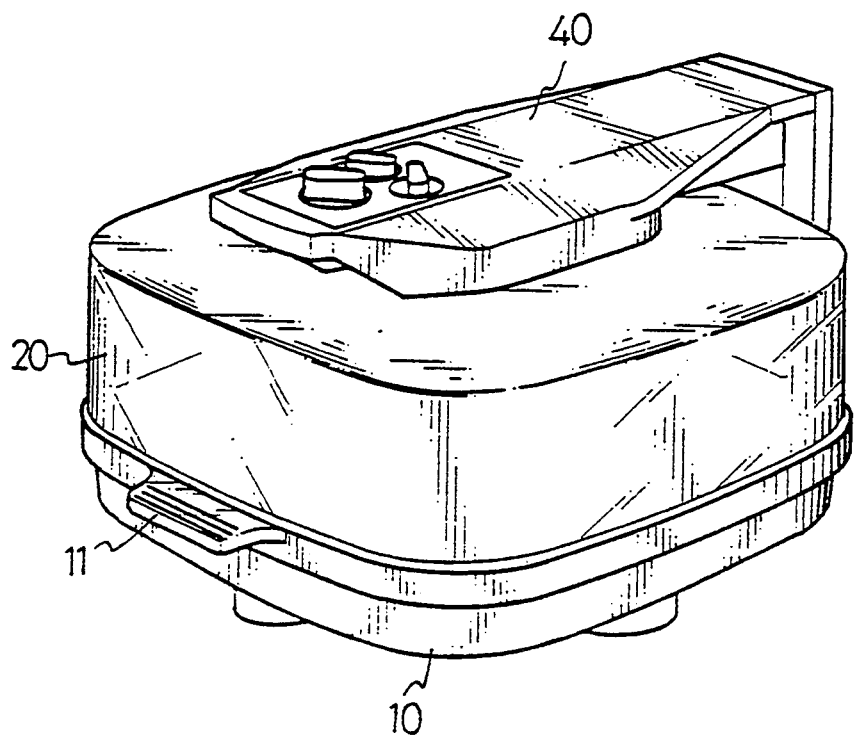
FIG. 1 is a perspective view of an air fryer in accordance with the present invention.
Figure 2:
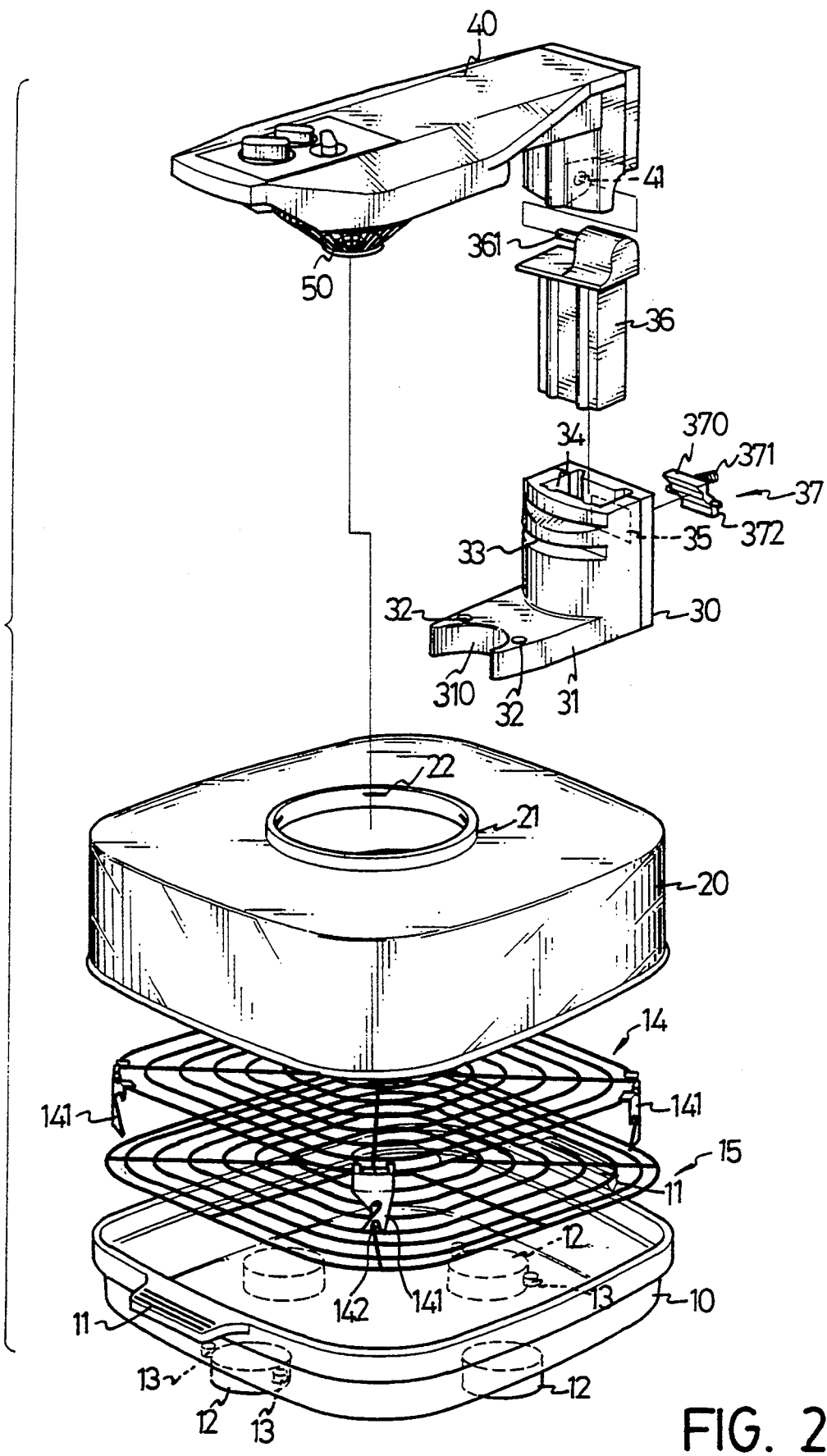
FIG. 2 is an exploded view of the air fryer.
Figure 3:
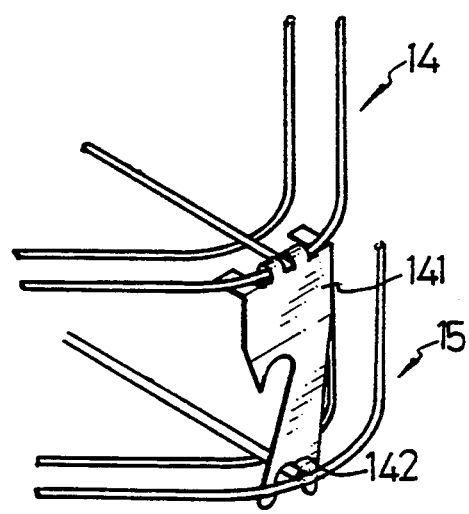
FIG. 3 is a partial perspective view illustrating the coupling of two grates.

Referring to the drawings, and initially to FIGS. 1 and 2, an air fryer in accordance with the present invention comprises a base 10 including four pads 12 disposed in the bottom portion thereof, a pair of ears 11 oppositely formed in the upper portion thereof, and a pair of stubs 13 oppositely provided beside each of the pads 12 which is located close to the respective ears 11, a first grate 14 and a second grate 15, the first grate including four corner areas each having a supporter 141 pivotally coupled thereto, each of the supporters 141 includes a recess 142 formed in the bottom portion for engagement with the second grate 15 such that the first grate 14 can be supported on the second grate 15, best shown in FIG. 3.

Figure 5:
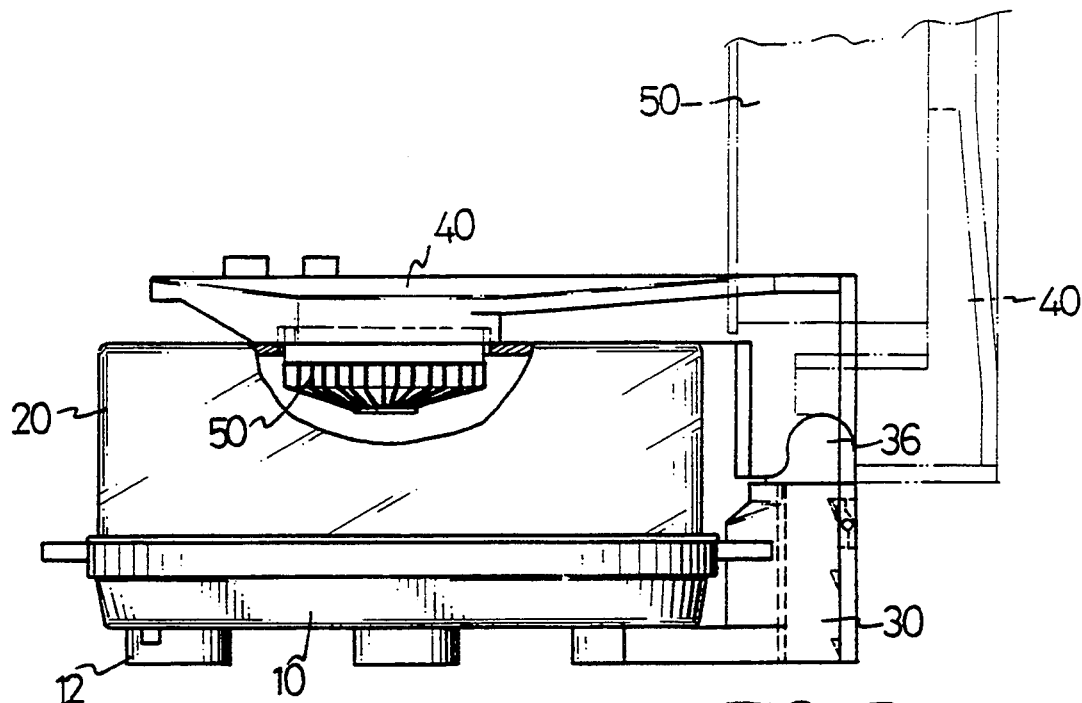
FIG. 5 is a schematic view illustrating the operation of the air fryer.

A seat 30 includes an extension 31 extended forward therefrom and having a depression 310 engaged with a respective pad 13 and having a pair of holes 32 for engagement with the stubs 13, a slot 33 is formed in the front portion of the seat 30 for engagement with the ear 11 and arranged such that the seat 30 can be attached to the base 10 by the engagement of the ear 11 with the slot 33 and by the engagement of the stubs 13 with the holes 32. The seat 30 may further be fixed to the base 10 by screws or the like. The seat 30 includes a space 34 opened upwards, an opening 35 formed in the seat 30 opposite to the slot 33 and communicated with the space 34, a post 36 has a lower portion slidably received in the space 34 and includes a shaft 361 laterally provided on the upper portion thereof, an arm 40 includes a depression 41 engaged with the shaft 361 such that the arm 40 is rotatable about the shaft 361, the arm 40 includes a blower 50 disposed in the bottom of the free end portion thereof. A cap 20 includes a rim 21 formed in the upper portion for attachment to the free end portion of the arm 40 and includes a plurality of grooves 22 formed in the inner portion for engagement with the corresponding projections (not shown) of the arm 40 such that the cap 20 can be solidly coupled to the arm 40. As shown in FIG. 5, the blower 50 is engaged in the cap 20.

Figure 4:
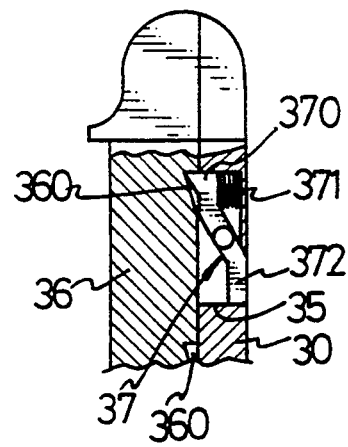
FIG. 4 is a partial cross sectional view showing the retaining means.

Referring next to FIG. 4 and again to FIG. 2, a catch 37 has a middle portion pivotally supported in the opening 35 of the seat 30 and includes a lower end 372 which is reachable from outside of the opening 35 and a pawl 370 formed in the upper end thereof, the post 36 includes a number of dents 360 formed in the rear portion thereof for engagement with the pawl 370 of the catch 37, and a spring 371 biased between the seat 30 and the pawl 370 of the catch 37 for biasing the pawl 370 to engagement with the dents 360. As shown in FIG. 4, the engagement between the pawl 370 and the dent 360 allows the post 36 to be moved upward relative to the seat 30 freely, however, when the post 36 is going to move downward relative to the seat 30, the lower end 372 of the catch 37 is depressed inwards of the seat 30, such that the pawl 370 is disengaged from the dents 360 and such that the post 30 may move downward relative to the seat 30. Accordingly, the distance between the arm 40 and the base 10 may be adjusted.

Figure 8:
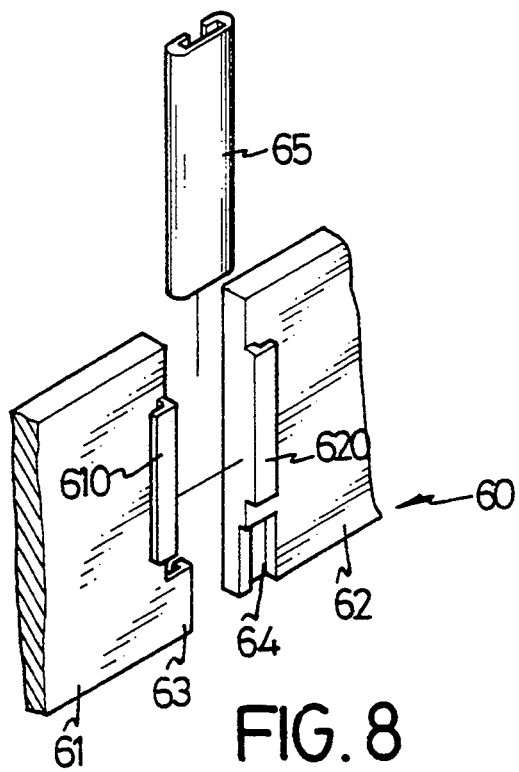
FIG. 8 is a partial exploded view illustrating the engaging means of the frame.
Figure 6:
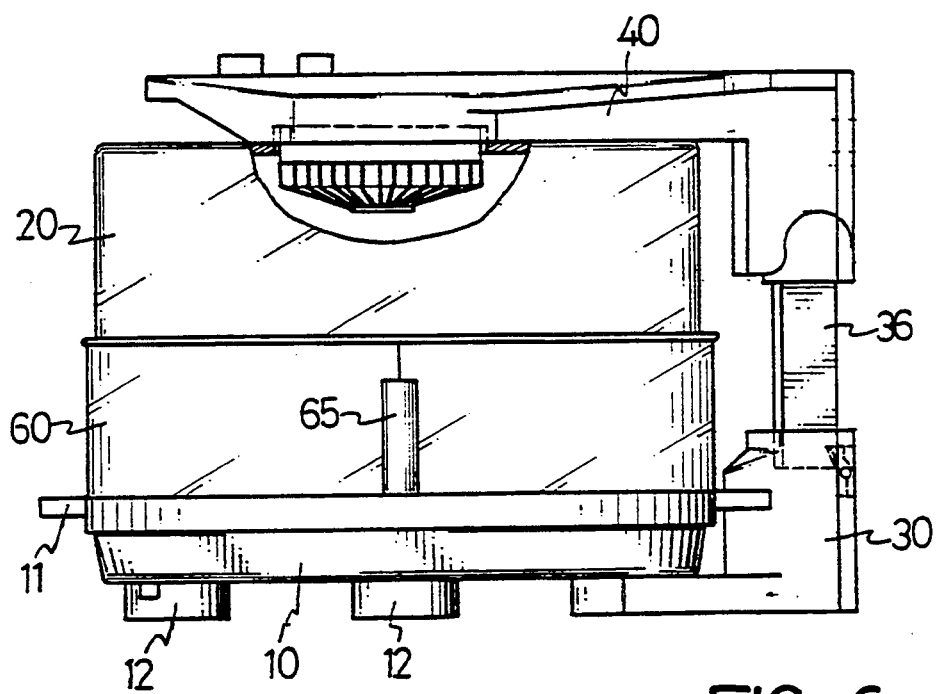
FIG. 6 is a schematic view similar to FIG. 5, illustrating the extension configuration of the air fryer.
Figure 7:
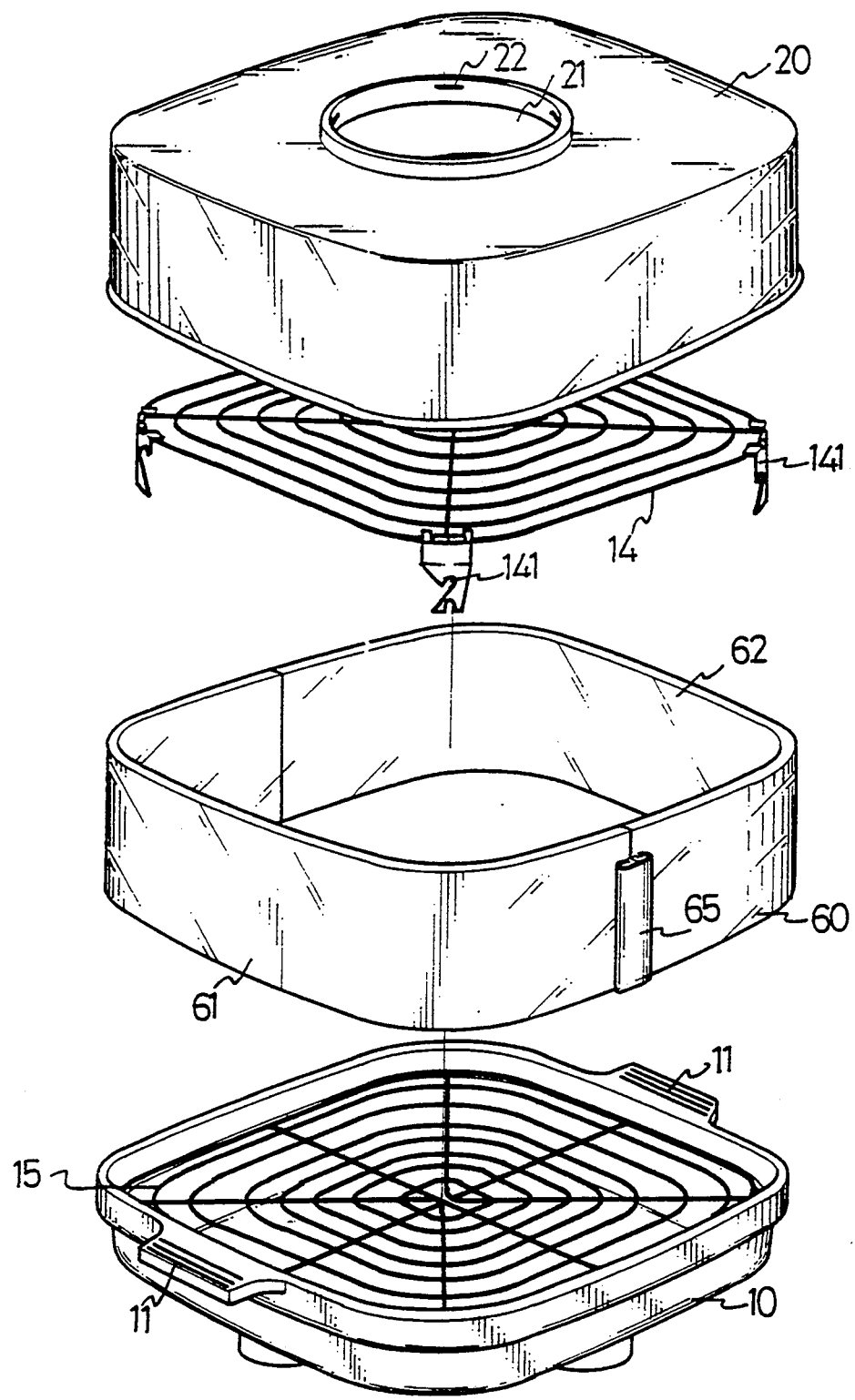
FIG. 7 is an exploded view illustrating the extension configuration of the air fryer.

Referring next to FIGS. 6, 7 and 8, when the post 36 and the arm 40 and thus the cap 20 are moved upward relative to the base 10, a gap will be formed between the cap 20 and the base 10, a spacer 60 is provided to fill in the gap and includes two halves 61, 62 coupled together by two couplers 65. Each of the two halves 61, 62 includes two end portions each having a flange 610, 620 formed thereon for engagement with the couplers 65 such that the two halves 61, 62 can be coupled together. A hook 63 is formed in each of the end portions of one half 61 for engagement with the cavity 64 formed in the other half 62 such that the two halves 61, 62 may further be solidly coupled together.

Accordingly, the air fryer in accordance with the present invention includes a cap 20 which can be adjusted upward or downward relative to the base 10, and a spacer 60 can be filled in the gap formed between the base 10 and the cap 20 such that the air fryer includes an adjustable cooking space and is suitable for cooking food pieces of larger or smaller sizes. The grates 14, 15 include two layers for supporting more food pieces.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air fryer comprising:
    a) a base;
    b) a seat attached to said base, said seat defining an upwardly opening space and a lateral opening communicating with the space;
    c) a post located in said space defined by the seat so as to be slidably movable with respect to the seat in a generally vertical direction, the post defining a plurality of dents aligned with the lateral opening;
    d) releasable catch means located on the seat so as to engage one of the plurality of dents so as to hold the post in a desired position relative to the seat;
    e) an arm having a blower thereon;
    f) a cap secured to the arm so as to normally cover the base;
    g) pivot means pivotally connecting the arm to the post such that the arm may be pivoted upwardly to that the cap may be moved upwardly away from its base; and
    h) a spacer located between said base and said cap, said spacer including two halves, each half having two end portions, each of said end portions of said two halves including a flange formed thereon, said flanges of two halves abutting each other so as to form two pairs of flanges, and two couplers coupling said pairs of flanges together, each of said end portions of a first of said two halves includes a hook formed thereon, and each of said end portions of a second of said two halves includes a cavity defined therein for engagement with said hook of said first half, whereby, said two halves are solidly coupled together.

2. An air fryer according to claim 1, wherein said base includes at least one stub formed on a bottom portion thereof, and at least one ear laterally extending therefrom and further comprises: an extension extending therefrom defining at least one hole for engagement with said stub of said base; and a slot defined therein for engagement with said ear in order to attach said seat to said base.

3. An air fryer according to claim 2, wherein said base includes at least three pads on said bottom portion thereof, one of said pads located adjacent to said stub, said extension of said seat further defining a depression for engagement with one of said pads, whereby, said seat is solidly attached to said base.

4. An air fryer according to claim 1 further comprising a first grate and a second grate located in said base, said first grate comprising four corner areas each having a supporter pivotally coupled thereto, each of said supporters defining a recess formed in a lower portion for engagement with said second grate, whereby, said first grate is supported on said second grate.

5. An air fryer of claim 1 wherein the releasable latch means comprises:
    a) a catch lever having a pawl on one end and a lower end, the catch pivotally attached to the seat such that the lower end is accessible through the lateral opening; and,
    b) spring biasing means operatively interposed between the seat and the catch lever to normally bias the pawl toward the post such that the pawl will engage one of the plurality of dents.

* * * * *